US012149902B2

(12) United States Patent
Homma et al.

(10) Patent No.: US 12,149,902 B2
(45) Date of Patent: Nov. 19, 2024

(54) PERSONAL SOUND SYSTEM COMBINING BONE CONDUCTION AND DIRECTIONAL SPEAKERS FOR PASSENGER SEATS

(71) Applicant: B/E Aerospace, Inc., Winston Salem, NC (US)

(72) Inventors: Kenji Homma, Glastonbury, CT (US); Dustin D. Caldwell, Portland, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 197 days.

(21) Appl. No.: 17/866,810

(22) Filed: Jul. 18, 2022

(65) Prior Publication Data

US 2024/0022856 A1 Jan. 18, 2024

(51) Int. Cl.

*H04R 5/02* (2006.01)
*H04R 1/32* (2006.01)

(52) U.S. Cl.

CPC ............ *H04R 5/023* (2013.01); *H04R 1/323* (2013.01); *H04R 2205/022* (2013.01); *H04R 2460/13* (2013.01)

(58) Field of Classification Search

CPC .. H04R 5/023; H04R 1/323; H04R 2205/022; H04R 2460/13; H04R 9/066; H04R 2400/07; H04R 3/14; H04R 2499/13

See application file for complete search history.

(56) References Cited

U.S. PATENT DOCUMENTS

| | | | | |
|---|---|---|---|---|
| 7,722,116 | B2 | 5/2010 | Takada et al. | |
| 2008/0130922 | A1* | 6/2008 | Shibata | H04R 5/023 381/1 |
| 2021/0219074 | A1* | 7/2021 | Zhang | G10K 11/175 |
| 2021/0402436 | A1 | 12/2021 | Yoo | |

FOREIGN PATENT DOCUMENTS

| | | |
|---|---|---|
| CN | 110949219 | 4/2020 |
| CN | 111791775 | 10/2020 |
| JP | 59174090 | 10/1984 |
| JP | 03175798 | 7/1991 |
| JP | 5045302 | 10/2012 |
| JP | 2018125829 | 8/2018 |
| JP | 3219108 | 11/2018 |
| WO | 2022090959 | 5/2022 |

OTHER PUBLICATIONS

European Patent Office, European Search Report dated Nov. 29, 2023 in Application No. 23185925.7.

* cited by examiner

*Primary Examiner* — Tuan D Nguyen
(74) *Attorney, Agent, or Firm* — SNELL & WILMER L.L.P.

(57) ABSTRACT

A sound system includes a seat, a bone conduction system configured to be disposed within the seat, and at least one directional speaker configured to provide audio through directional acoustic delivery contemporaneously with the bone conduction system. The bone conduction system configured to provide audio through bone conduction sound.

18 Claims, 6 Drawing Sheets

PERSONAL SOUND SYSTEM COMBINING BONE CONDUCTION AND DIRECTIONAL SPEAKERS FOR PASSENGER SEATS

FIELD

The present disclosure generally relates to the field of personal sound systems and, more particularly, to bone conduction sound systems.

BACKGROUND

Passengers flying in a commercial aircraft typically wear headphones and earphones in order to hear audio from the inflight entertainment system. Wearing head-worn devices can be awkward and uncomfortable. It thus is desirable to hear audio without wearing these devices. However, using conventional audio speakers is not desirable since the audio would bother surrounding passengers.

SUMMARY

A sound system is described herein. The sound system includes a seat, a bone conduction system configured to be disposed within the seat, and at least one directional speaker configured to provide audio through directional acoustic delivery contemporaneously with the bone conduction system. The bone conduction system configured to provide audio through bone conduction sound.

In various embodiments, the sound system includes a sound absorbing partition, wherein the seat is configured to be at least partially enclosed by the sound absorbing partition and the at least one directional speaker is configured to be disposed within the sound absorbing partition.

In various embodiments, the sound absorbing partition includes a back panel, a first side panel, and a second side panel. The first and second side panels extend in a same direction from opposite ends of the back panel.

In various embodiments, the at least one directional speaker includes a first directional speaker and a second directional speaker.

In various embodiments, the first directional speaker is disposed in the first side panel and the second directional speaker is disposed in the second side panel.

In various embodiments, the first directional speaker and the second directional speaker are disposed on interior surfaces of the first and second panels, respectively.

In various embodiments, the sound system further includes a headrest coupled to the seat and a bone conduction exciter configured to be integrated into the headrest.

In various embodiments, the headrest includes an open cell foam material configured to minimize sound radiation from the bone conduction exciter.

In various embodiments, the bone conductor exciter includes a frame, a mass-reaction actuator, a vibrating ring, and suspensions.

In various embodiments, the frame is a circular component with a first diameter and the vibrating ring is a circular component with a second diameter. The second diameter is less than the first diameter of the frame such that the vibrating ring is configured to be disposed within the frame.

In various embodiments, the suspensions are coupled to an inner circumference of the frame and an outer circumference of the vibrating ring such that the suspensions indirectly couple the vibrating ring and the frame.

In various embodiments, the mass-reaction actuator is disposed below the vibrating ring and configured to interact with the vibrating ring to cause a vibration.

In various embodiments, the frame comprises holes disposed along a circumference of the frame.

In various embodiments, the sound system further includes a padding. The padding is disposed on at least one of a top surface of the frame or a top surface of the vibrating ring.

In various embodiments, the at least one direction speaker is at least one of a directional air conduction speaker or a flat panel radiator speaker.

In another aspect, a sound system is described herein. The sound system includes a bone conduction system and a direction speaker. The bone conduction system includes a receiver configured to receive a signal from a communication system and a transducer configured to convert the signal from the receiver to a mass-reaction actuator. The mass-reaction actuator is configured to output the signal at a mid frequency. The directional speaker is configured to receive the signal and output the signal at a high frequency.

In various embodiments, the bone conduction system is operatively coupled to the communication system via a wired configuration or a wireless configuration.

In various embodiments, the sound system further includes a power source configured to be coupled to the bone conduction system and the directional speaker.

the direction speaker is configured as a planar source

In various embodiments, the mid frequency is a range between 0.5 and 2.0 kHz, and the high frequency is greater than 2 kHz.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

The detailed description of exemplary embodiments herein makes reference to the accompanying drawings, which show exemplary embodiments by way of illustration.

While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A seat integrated passenger audio system is disclosed herein which uses both bone conduction speakers integrated into the headrest and directional audio speakers also integrated to the seat. The bone conduction speakers provide audio though vibration to a passenger's head. Due to user comfort consideration, padding with sufficient thickness is added at the contact point of the bone conduction speaker which touches the head. This padding reduces efficiency of bone conduction device to provide sound at high frequencies. This issue is circumvented by combining with air-conduction speakers which provide audio in the high frequency range, thereby the sound quality. Accordingly, the passenger can enjoy audio from an entertainment system, for instance, without wearing head-worn audio devices.

Figure 1:
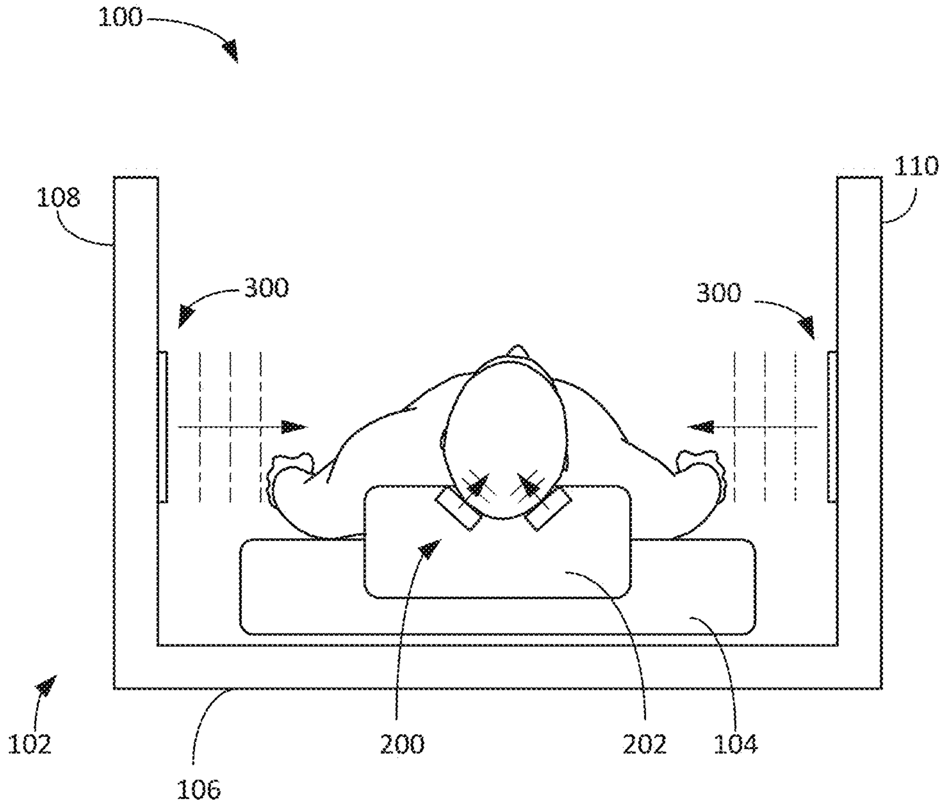
FIG. 1 is a perspective view of a sound system in accordance with various embodiments.

Referring to FIG. 1, a sound system 100 is illustrated. The sound system 100 is configured to provide audio to a passenger without the use of head/earphones with negligible audio bleed (i.e., unintentional audio release) to other passengers. The sound system 100 may be integrated with a seat enclosure for an airplane. For instance, each passenger may have a sound system (e.g., sound system 100). The sound system 100 may include a sound absorbing partition 102. The sound absorbing partition is configured to absorb and minimize sounds leakage from the additional components of the sound system 100, as described further herein. For instance, the sound absorbing partition 102 is configured to absorb and minimize sound leakage of at high frequencies above around 1-2 kHz. In various embodiments, the sound absorbing partition 102 may include a sound absorbing liner to further improve the sound absorbing qualities of the sound system 100. The sound absorbing partition 102 is configured to at least partially enclose a seat 104 of the passenger. The sound absorbing partition 102 also works to reduce the ambient noise surrounding the passenger by absorbing the environmental noise. The sound absorbing partition 102 may include a back panel 106, a first side panel 108, and a second side panel 110. The first and second side panels 108, 110 may extend in the same direction from opposite ends of the back panel 106. The sound absorbing partition 102 may be constructed from any suitable material, including sound attenuating foam, sound attenuating honeycomb baffles, acoustic eggcrate foam, and/or other sound dampening materials.

Figure 2:
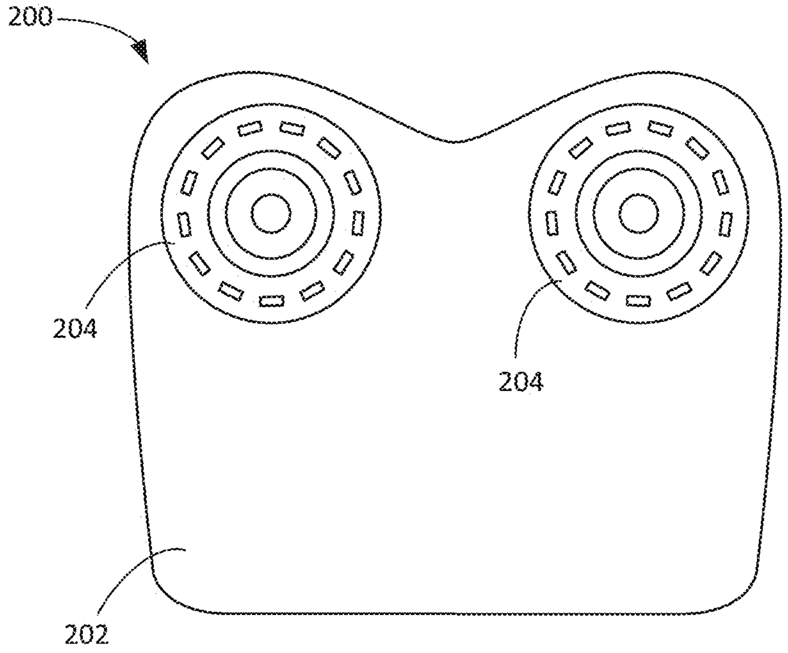
FIGS. 2-3 illustrate a perspective view of a bone conduction system of the sound system of FIG. 1, in accordance with various embodiments.
Figure 3:
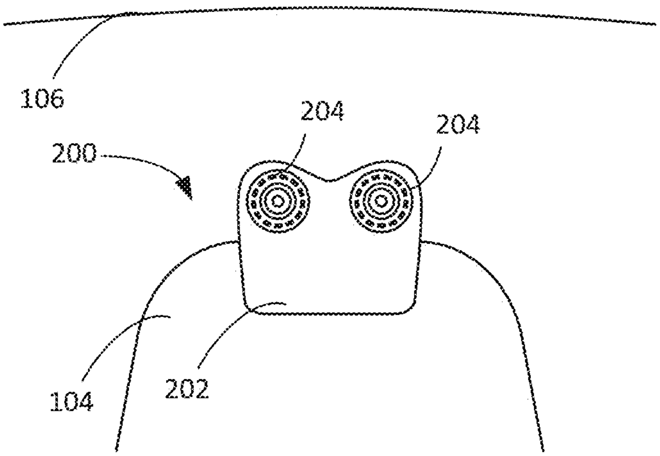

The sound system includes a bone conduction (BC) system 200. The BC system 200 is configured to provide audio to the passenger through bone conduction. The BC system 200 is configured to provide audio input in the mid frequency range (e.g., 0.5-2 kHz). The sound radiation coming from the BC system 200 is minimal due to direct conduction of sound in the form of vibration to a head of the passenger. The BC system 200 includes a headrest 202 and a bone conduction (BC) exciter 204. The BC exciter 204 may be integrated into the headrest 202, wherein the headrest 202 is coupled to the seat 104 (see e.g., FIGS. 2-3). Accordingly, the BC exciter 204 is configured to provide direct sound to the head of the passenger via conduction. The headrest 202 may include an open cell foam material configured to minimize sound radiation and to conform to the head of the passenger for good contact between the head and the BC exciter 204.

Figure 4:
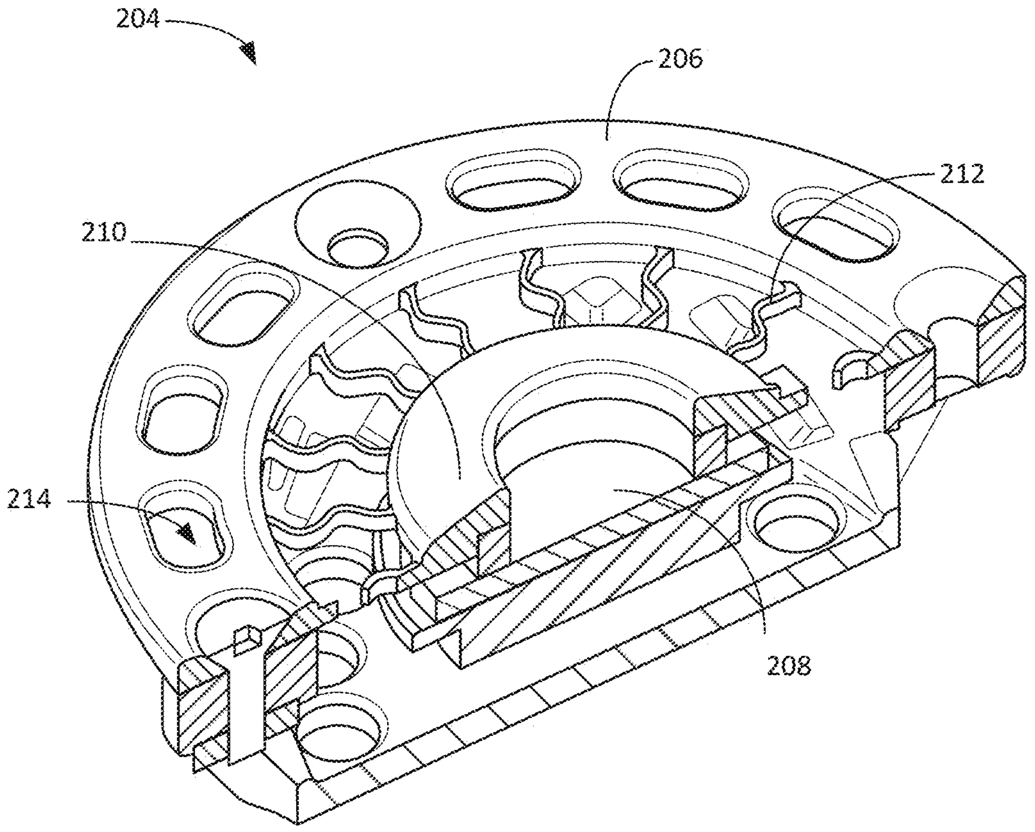
FIG. 4 is a cross-sectional view of a bone conduction exciter of the bone conduction system of FIGS. 2-3, in accordance with various embodiments.
Figure 5:
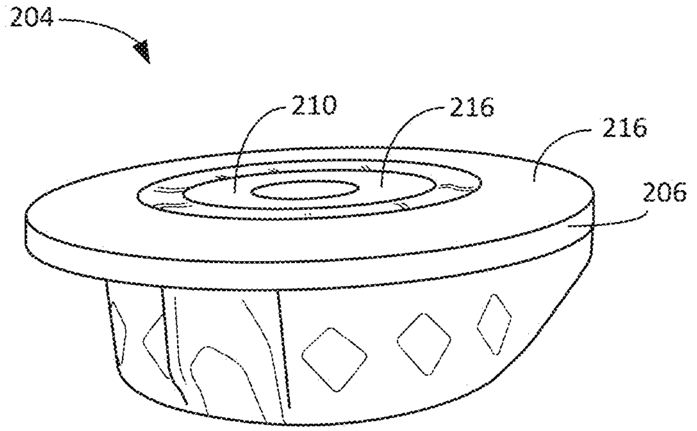
FIG. 5 is a perspective view of the bone conduction exciter of FIG. 4, in accordance with various embodiments.

With additional reference to FIGS. 4-5, the BC exciter 204 includes a frame 206, a mass-reaction actuator 208, a vibrating ring 210, and suspensions 212. The frame 206 maybe a circular component with a first diameter and configured to support the mass-reaction actuator 208, the vibrating ring 210, and the suspensions 212. For instance, the vibrating ring 210 may similarly be a circular component with a second diameter less than the first diameter of the frame 206 such that the vibrating ring 210 is configured to be disposed within the frame 206. Further, the suspensions 212 may be coupled to an interior surface, or inner circumference, of the frame 206 and an exterior surface, or an outer circumference, of the vibrating ring 210. In various embodiments, the suspensions 212 may be springs, or coils, for instance. Accordingly, the suspensions 212 indirectly couple the vibrating ring 210 and the frame 206 while allowing the vibrating ring 210 to move, or vibrate, in response to the mass-reaction actuator 208. For instance, the mass-reaction actuator 208 may be disposed below the vibrating ring 210 and configured to interact with the vibrating ring 210 to cause a vibration. The BS exciter 204 thus reacts with audible soundwaves and introduces force on the mass-reaction actuator 208 which vibrates.

In various embodiments, the frame 206 may include holes 214 to minimize the re-radiation of sound from the BC exciter 204. For instance, the holes 214 may be through holes disposed around the circumference of the frame 206. In various embodiments, the BC exciter 204 may include padding 216. For instance, the padding 216 may be a soft foam padding for providing additional comfort to the passenger. The padding 216 may be disposed on a top surface of the frame 206 with cut outs corresponding with the holes 214 on the frame 206. Further, the padding may be disposed on a top surface of the vibrating ring 210.

Referring again to FIG. 1, the sound system 100 further includes at least one directional speaker. For instance, the sound system 100 may include a first directional speaker 300 and a second directional speaker 302. The first directional speaker 300 may be disposed in the first side panel 108. The second directional speaker 302 may be disposed in the second side panel 110. For instance, the first directional speaker 300 and the second directional speaker 302 may be disposed on interior surfaces of the first and second panels 108, 110, respectively, such that the first and second directional speakers 300, 302 are configured to direct sound toward the passenger positioned within the sound absorbing partition 102.

Figure 6:
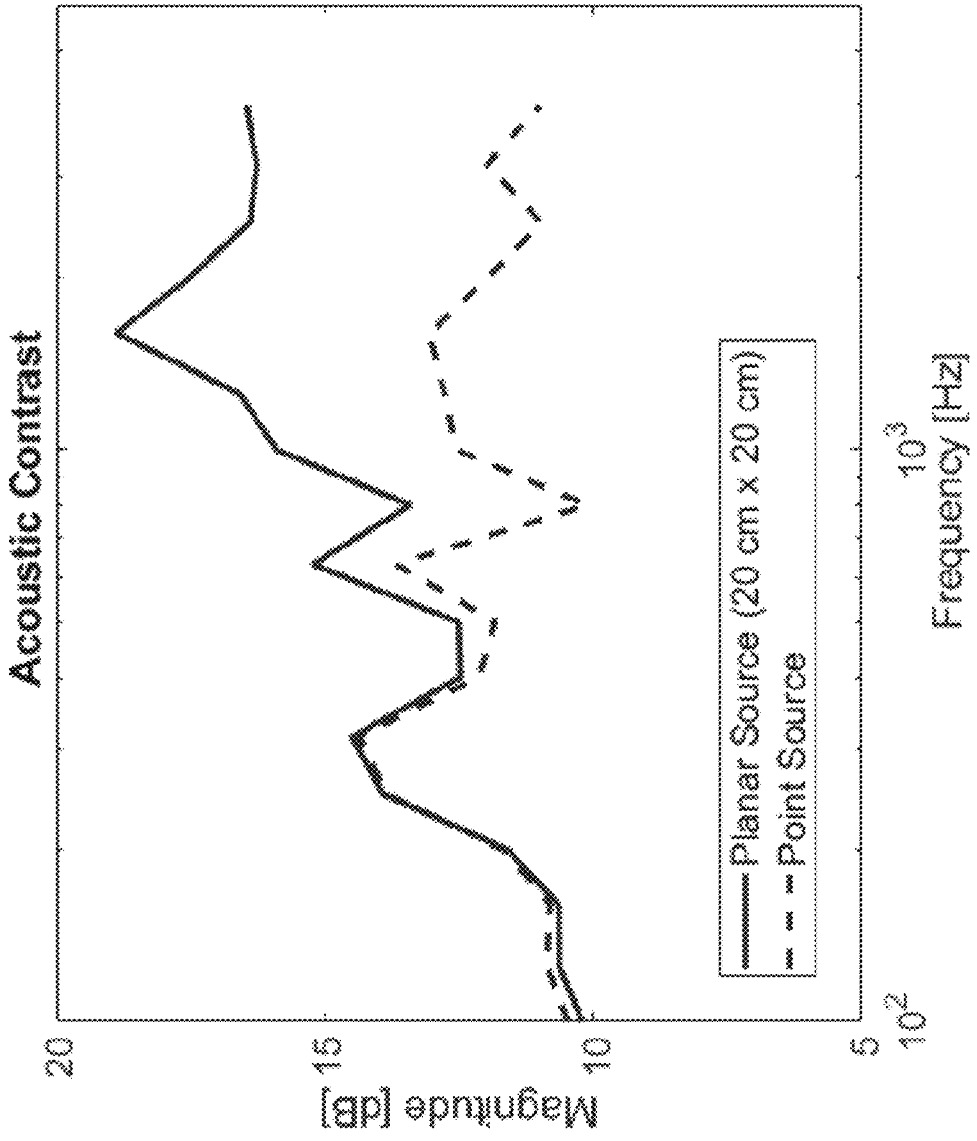
FIG. 6 is a chart of experimental results of the acoustic contrast of a directional speaker of the bone conduction system of FIGS. 2-3, in accordance with various embodiments.

The first and second directional speakers 300, 302 may be configured to output high frequencies (e.g., greater than 2 kHz). In various embodiments, the first and second directional speakers 300, 302 may be directional air conduction speakers. In various embodiments, the first and second directional speakers 300, 302 may be flat panel radiator speakers. The directional source of the first and second directional speakers 300, 302 may be based on a planar array may focus the sound more directly toward the head of the passenger and improve acoustic contrast. The enhanced acoustic contrast benefit may be more pronounced at higher frequencies (e.g., greater than 2 kHz). For instance, as shown in FIG. 6, the acoustic contrast is improved with a planar source, as compared with a point source. The acoustic contrast is defined here as the difference in the sound level (e.g., in dB scale) between the sound around the passenger's head position and the sound in the area some distance away from the passenger's position. Higher acoustic contrast means that the sound level difference is high, thus less sound leakage or "bleed" to the surrounding area. A planar source is a type of speaker that has a moving diaphragm with a relatively large surface area. Sound created by a planar source tends to be more directional since the air is displaced in a way that introduces a planar wave front which propagates in a certain direction without little expansion. In comparison, a regular speaker with a relatively small diaphragm is more similar to a point source which radiates sound in a more omnidirectional manner with a spherical wave front. In practice, the degree of directionality depends on the frequency and the size of the planer source. For a planar source of practical size considered for the sound system 100 (e.g., 20-30 cm in size), the directionality can be obtained at frequencies higher than 1-2 kHz. In various embodiments, a planar source may be implemented with a planar array of multiple small speakers that covers the same footprint as a planar source and driven all in phase.

Figure 7:
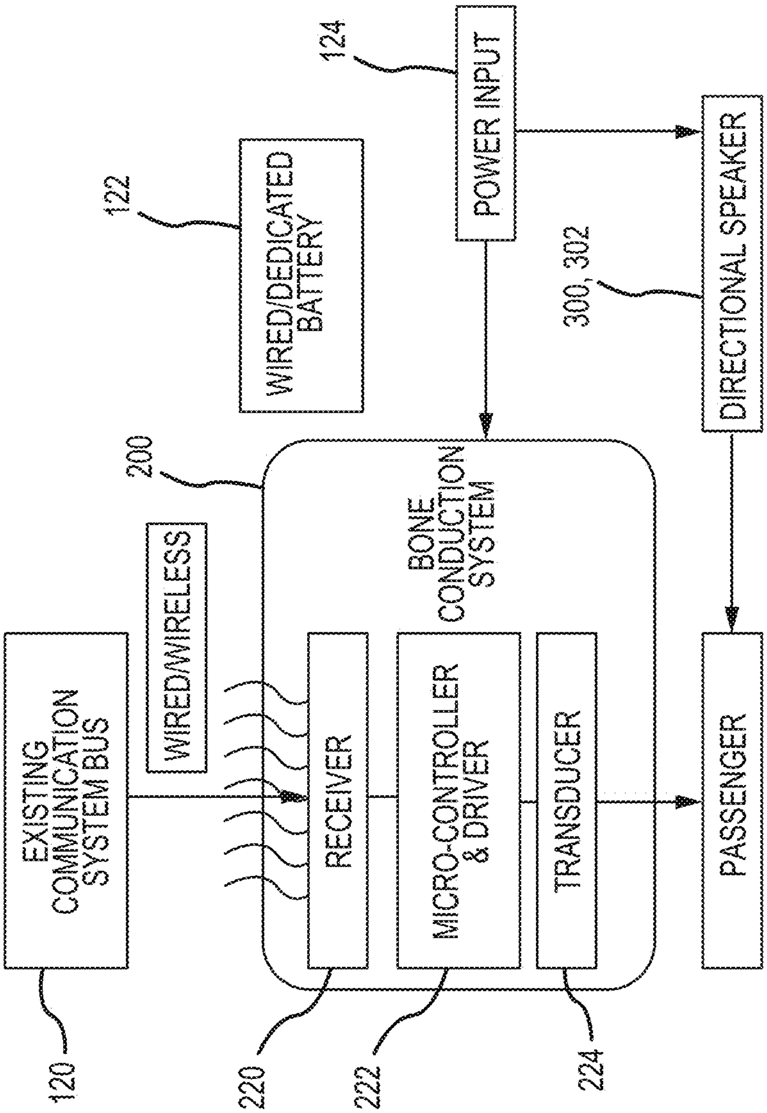
FIG. 7 is a schematic of the sound system of FIG. 1, in accordance with various embodiments.

Referring now to FIG. 7, a schematic of the sound system 100 is illustrated. The BC system 200 may be configured to communicate in any appropriate manner with an external device/system, such as a cabin communication system bus 120 of an aircraft, including via a wired configuration or a wireless configuration (where the BC system 200 could then include an appropriate receiver 220). In various embodiments, the first and second direction speakers 300, 302 are similarly configured to receive communication in any appropriate manner with an external device/system, such as a cabin communication system bus 120 of an aircraft. For instance, the sound system 100 may be configured to split frequencies between the BC system 200 and the first and second direction speakers 300, 302 such that the higher frequencies are transmitted to the first and second direction speakers 300, 302. In other words, the sound system 100 is configured to receive the same signal (e.g., music etc.) from a communication, or "infotainment" system, wherein the sound system 100 includes a cross-over type circuit to split the signal: the mid-frequencies (0.5-2 kHz) will be sent to the BC system 200 and the high frequencies (above 2 kHz) will be sent to the directional speakers 300, 302. Any appropriate power source may be used for the bone conduction system 200, including a battery 122 incorporated by the BC system 200 or by a wired connection with an external power unit 124 (e.g., of an aircraft).

The BC system 200 may include a bone conduction (BC) transducer 224 that provides audio to a passenger. For instance, the transducer 224 may be configured to receive the input received by the receiver 220 and convert the sounds signal into an energy signal to be received by the mass-reaction actuator 208, wherein the mass-reaction actuator 208 triggers the vibration received by the passenger.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A sound system, comprising:

a seat;

a bone conduction system configured to be disposed within the seat, the bone conduction system configured to provide audio through bone conduction sound; and at least one directional speaker configured to provide audio through directional acoustic delivery contemporaneously with the bone conduction system, wherein the at least one directional speaker is an air conduction speaker.

2. The sound system of claim 1, further comprising:

a headrest coupled to the seat and a bone conduction exciter configured to be integrated into the headrest; and a sound absorbing partition, wherein the seat is configured to be at least partially enclosed by the sound absorbing partition and the at least one directional speaker is configured to be disposed within the sound absorbing partition.

3. The sound system of claim 1, wherein the sound absorbing partition comprises a back panel located behind the headrest and extending above the headrest, a first side panel, and a second side panel, wherein the first and second side panels extend in a same direction from opposite ends of the back panel and extend beyond the headrest in the same direction.

4. The sound system of claim 3, wherein the at least one directional speaker comprises a first directional speaker and a second directional speaker.

5. The sound system of claim 4, wherein the first directional speaker is disposed in the first side panel and the second directional speaker is disposed in the second side panel.

6. The sound system of claim 5, wherein the first directional speaker and the second directional speaker are disposed on interior surfaces of the first and second side panels, respectively.

7. The sound system of claim 3, wherein the headrest comprises an open cell foam material configured to minimize sound radiation from the bone conduction exciter.

8. The sound system of claim 3, wherein the bone conduction exciter comprises a frame, a mass-reaction actuator, a vibrating ring, and suspensions.

9. The sound system of claim 8, wherein the frame is a circular component with a first diameter and the vibrating ring is a circular component with a second diameter, the second diameter less than the first diameter of the frame such that the vibrating ring is configured to be disposed within the frame.

10. The sound system of claim 9, wherein the suspensions are coupled to an inner circumference of the frame and an outer circumference of the vibrating ring such that the suspensions indirectly couple the vibrating ring and the frame.

11. The sound system of claim 8, wherein the mass-reaction actuator is disposed below the vibrating ring and configured to interact with the vibrating ring to cause a vibration.

12. The sound system of claim 8, wherein the frame comprises holes disposed along a circumference of the frame.

13. The sound system of claim 8, further comprising a padding, wherein the padding is disposed on at least one of a top surface of the frame or a top surface of the vibrating ring.

14. The sound system of claim 1, wherein the at least one directional speaker is a flat panel radiator speaker.

15. A sound system, comprising:

a bone conduction system comprising:

a receiver configured to receive a signal from a communication system; and a transducer configured to convert the signal from the receiver to a mass-reaction actuator, the mass-reaction actuator configured to output the signal at a mid frequency between and inclusive of 0.5 and 2.0 kHz; and a directional speaker configured to receive the signal and output the signal at a high frequency of greater than 2.0 kHz, wherein the directional speaker is configured to output the signal contemporaneously with the output signal of the bone conduction system, and wherein the at least one directional speaker is an air conduction speaker.

16. The sound system of claim 15, wherein the bone conduction system is operatively coupled to the communication system via a wired configuration or a wireless configuration.

17. The sound system of claim 15, further comprising a power source configured to be coupled to the bone conduction system and the directional speaker.

18. The sound system of claim 15, wherein the direction speaker is configured as a planar source.

* * * * *